United States Patent [19]

Wu et al.

[11] Patent Number: 4,944,106
[45] Date of Patent: Jul. 31, 1990

[54] FISHING HOOKER OR CATCHER

[76] Inventors: Jaw-Shyong Wu, No. 15-3, Ming-Li St., Tai-Chung City; Yun-Terng Wang, No. 50-3, Chung-Shin Rd., Pu-Li Chen, Nan-Tu-Hsien; Hann-Chang Wu, No. 85, Pei-Chern St., Pu-Li Chen, Nan-Tu Hsien; Jiin-Tsong Shieh, No. 5, Sec. 1, Shi-An Rd., Pu-Li Chen, Nan-Tu Hsien, all of Taiwan

[21] Appl. No.: 410,813
[22] Filed: Sep. 22, 1989
[51] Int. Cl.$^5$ ............................................. A01K 97/00
[52] U.S. Cl. ......................................................... 43/15
[58] Field of Search .............................. 43/15, 16, 17

[56] References Cited

U.S. PATENT DOCUMENTS

| | | | |
|---|---|---|---|
| 2,479,399 | 8/1949 | Patten | 43/15 |
| 2,530,007 | 11/1950 | Euzent | 43/15 |
| 3,823,501 | 7/1974 | Bybee | 43/15 |
| 4,547,990 | 10/1985 | Hero | 43/15 |

Primary Examiner—M. Jordan
Attorney, Agent, or Firm—Ladas & Parry

[57] ABSTRACT

A fishing apparatus includes a fishline-holding device, a fishing rod and a mounting device for mounting the fishline-holding device to the fishing rod. The fishline-holding device includes a hollow elongated housing; a threaded rod which is positioned in the housing; a sliding member, having a hook member and a push rod connected thereto, which is slidably retained in two longitudinally opposed guide slots in the housing so that the hook member can move longitudinally with respect to the housing; a biasing member, in the form of a spring, interconnected between the threaded rod and the sliding member; a retaining device provided for retaining the hook member of the sliding member when the spring is stretched to a position to enable the hook member to being hooked by the retaining device; and a linking device connected to the hook member, the retaining device and a fishline. The hook member can be disengaged from the retaining device by the pulling of the fishline, which is triggered by a fish snapping at a baited hook attached to said fishline.

6 Claims, 5 Drawing Sheets

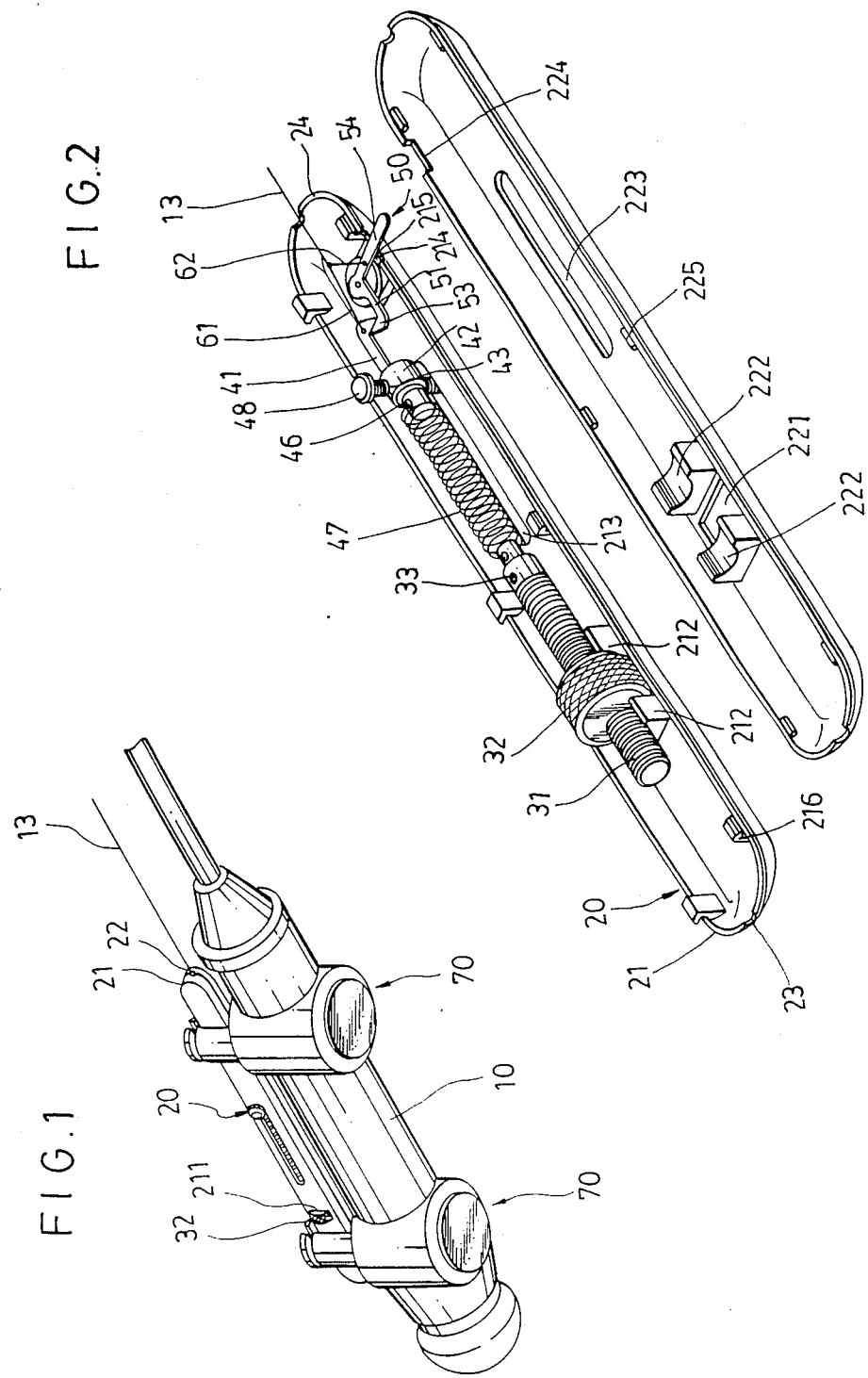

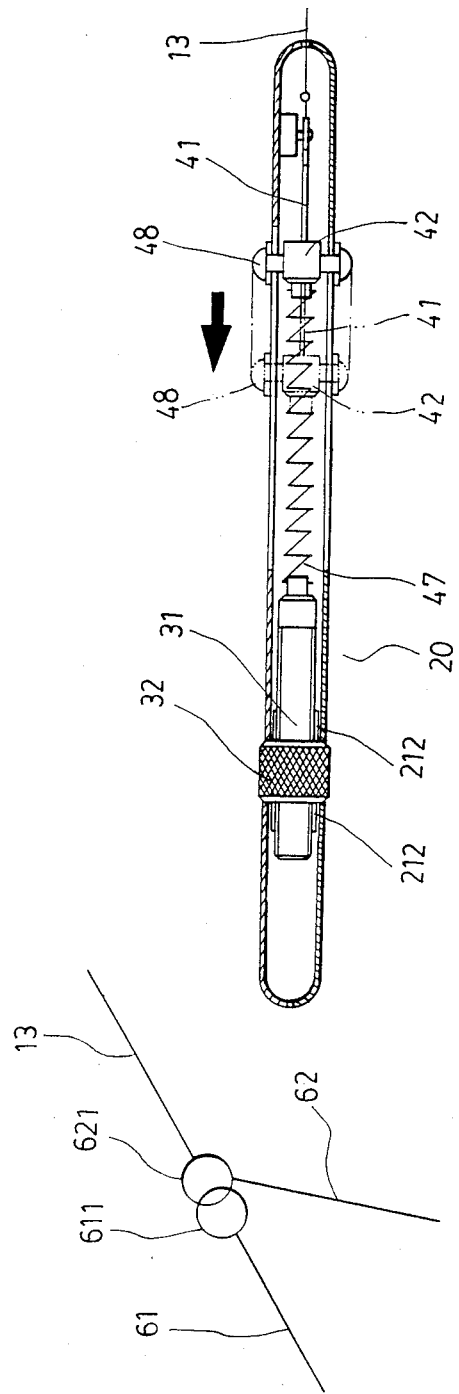

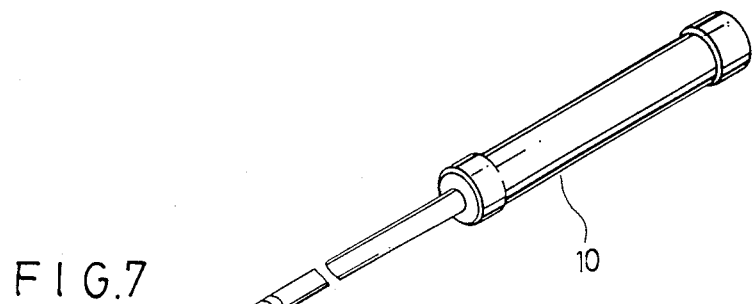
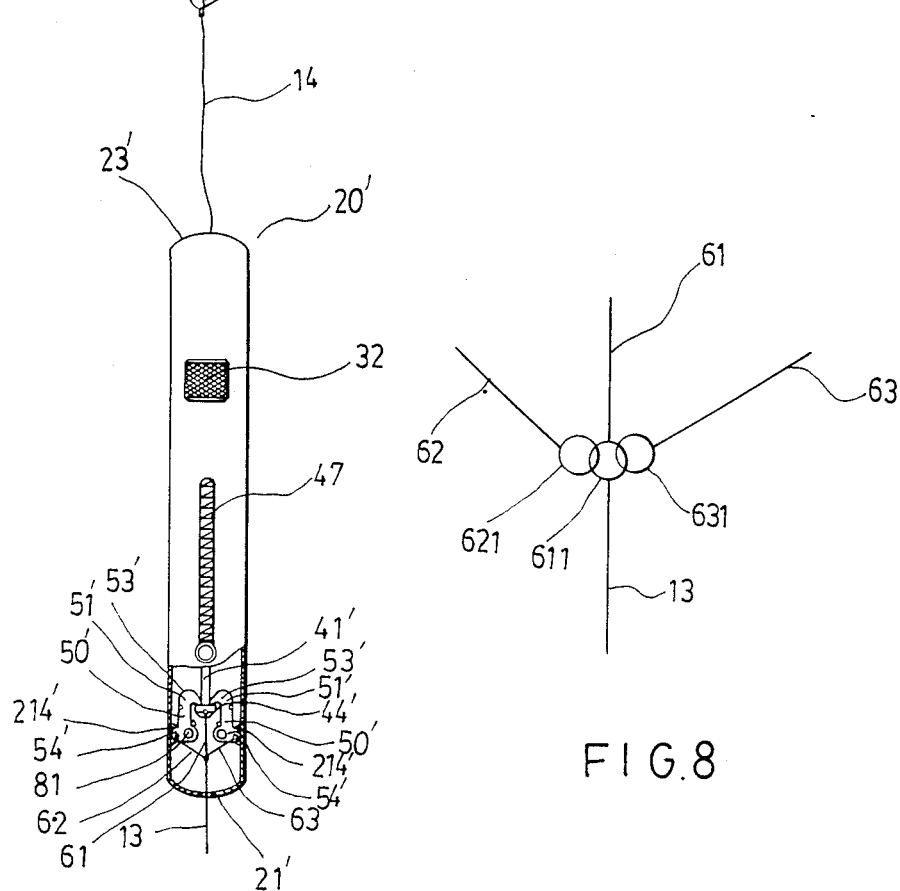
FIG.7
FIG.8

FISHING HOOKER OR CATCHER

BACKGROUND OF THE INVENTION

This invention relates to a fishing apparatus, more partricularly to a fishing apparatus which can automatically jerk back on the fishline connected thereto, and thereby the fishhook attached to said fishline, so as to hook up a fish when said fish bites the baited fishhook.

Conventionally, a fishing rod having a fishline fastened thereto to which a bob and a fishhook are attached is used to catch fish. To judge whether a fish has bitten a baited fishhook located under water, an angler must pay attention to the bob which sinks when the baited fishhook is bitten and pulled by a fish. In response to the sinking of the bob, the anglere must quickly pull up the fishing rod so as to set the hook in the mouth of the fish, otherwise the fish will quickly escape. However, it is boring and monotonous for an angler to watch the bob for a long period of time. In addition, the bob may be moved by wind, or water current, etc., instead of by a fish, thus leading the angler to pull up the baited fishhook in vain.

SUMMARY OF THE INVENTION

It is therefore a main object of this invention to provide an automatic fishing apparatus which can automatically jerk back on the fishline attached thereto and thereby, cause the fishhook to hook a fish when said fish bites the bait on said fishhook and pulls said fishline.

Accordingly, an automatic fishing apparatus of this invention comprises a fishline-holding device which includes:

an elongated hollow housing having a first and a second end, and two opposed guide slots respectively and longitudinally formed therein;

a sliding member having a push rod connected thereto, said push rod having two end portions slidably received in the guide slots of said housing so that the sliding member can be longitudinally guided to move along the guide slots, and a hook member extending longitudinally therefrom toward the second end of said housing;

a threaded rod longitudinally disposed in the housing and clamped by the clamp members provided in said housing so that the threaded rod can be moved longitudinally and prevented from rotation thereat, said threaded rod having an adjustng member mounted thereon by means of the interconnection of the threads on the inner surface of the adjusting member and on the threaded rod, the adjusting member being rotatably retained between the clamp members of said housing and having a portion thereof protruding out of an opening formed in said housing, so that the adjusting member can be axially rotated by a user's fingers to enable the threaded rod to move longitudinally;

a biasing member interconnected between the sliding member and the threaded rod so as to urge the sliding member to move toward the threaded rod;

a means for retaining the hook member of the sliding member against the biasing action of the biasing member, which is mounted in the housing near the second end thereof; and a linking member which links the hook member of the sliding member and the retaining means, being attached to an end to a fishline so that the hook member can be disengaged from the retaining means by the pulling of the fishline which is triggered by a fish snapping at the baited hook.

BRIEF DESCRIPTION OF THE DRAWINGS

Other features and advantages of this invention will become apparent in the following detailed description of the preferred embodiments of this invention with reference to the accompanying drawings, in which:

FIG. 1 is a perspective view of a preferred embodiment of a fishing apparatus of this invention;

FIG. 2 is a paritally exploded perspective view of a fishline-holding device of the fishing apparatus of this invention shown in FIG. 1;

FIG. 3 is an enlarged view showing the linkage of two steel wires and the fishline in the fishline-holding device of this invention shown in FIG. 2;

FIG. 4 is a sectional schematic view showing the fishline-holding device of FIG. 2 in an operative poition;

FIG. 7 is a perspective, partially broken away, view of another preferred embodiment of a fishing apparatus of this invention; and FIG. 8 is an enlarged schematic view showing the linkage of the steel wires and the fishline of the fishing apparatus shown in FIG. 8 according to this invention.

DETAILED DESCRIPTION OF THE PREFERRED EMBODIMENT

Figure 5:
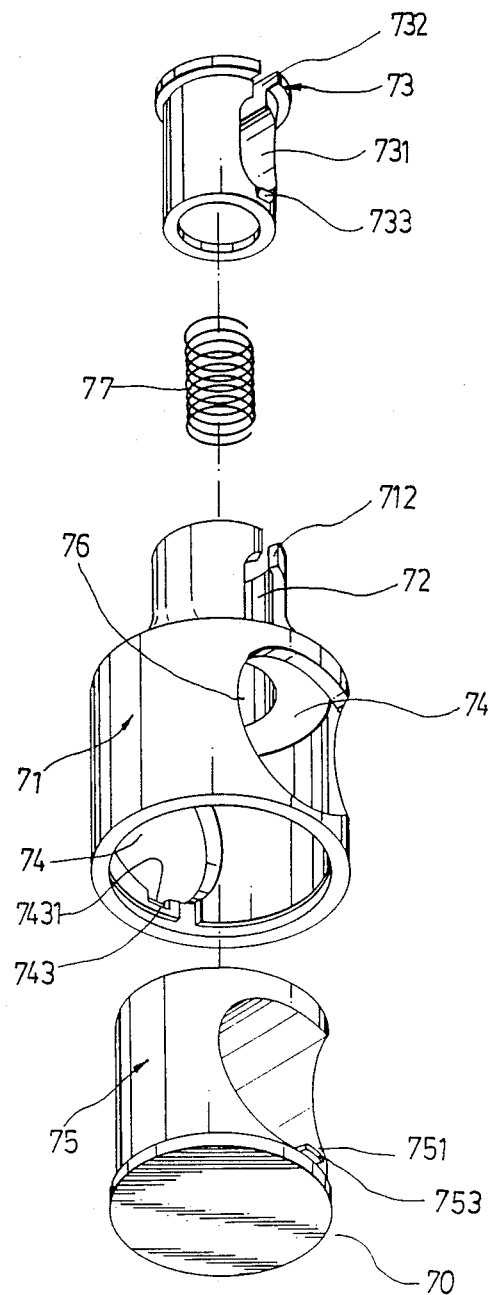
FIG. 5 is a perspective exploded view of the mounting device of the fishing apparatus of this invention.

Rererring to FIG. 1, a preferred embodiment of the fishing apparatus of this invention is shown. The fishing apparatus includes a fishline-holding device 20, a fishing rod 10 and a pair of mounting devices 70 for attaching the fishline-holding device 20 to the fishing rod 70.

Referring to FIG. 2, the fishline-holding device 20 includes an elongated hollow housing consisting of a first and a second half 21, 22. A plurality of snap hooks 216 are provided at the periphery of the first half 21 of the housing and a plurality of projections 225 are correspondingly provided at the periphery of the second half 22 of the housing so as to being retained by the snapping hooks 216. Thereby, the two halves 21, 22 can be detachably engaged with each other. Two pairs of U-shaped clamp members 212, 222 are correspondingly and respectively fixed on the two halves 21, 22 of the housing near the first end 23 thereof. An adjusting member 32 is rotatably positioned between the U-shaped clamp members 212, 222 and has a portion thereof protruding out from an opening 211, 221 correspondingly formed in the two halves 21, 22 of the housing, as illustrated in FIG. 1. A threaded rod 31 is threaded through the adjusting member 32 and clamped by the two pairs of the clamp members 212, 222 so as to prevent said threaded rod 31 from rotating, and allow said threaded rod 31 to be moved longitudinally with respect to the adjusting member 32 in the housing, by means of the axial rotation of the adjusting member 32.

Two opposed guide slots 213, 223 are respectively and longitudinally formed in the two halves 21, 22 of the housing in the middle section thereof. A sliding member 42 has a push rod 43 mounted threadably thereon which is slidably positioned in the guide slots 213, 223 and has two enlarged ends 48 protruding out therefrom, so that the sliding member 42 can be moved longitudinally in the housing. A biasing member 47, such as a coiled spring, is interconnected between an end 33 of the threaded rod 31 and a connecting portion 46 of the sliding member 42. The sliding member 42 has a hook member 41 longitudinally extending therefrom which is opposite to the connecting portion 46 thereof. An L-shaped member 50 is pivoted to a mounting plate 214 which is provided on the first half 21 of the housing near the second end 24 thereof. The L-shaped member 50 has a first arm 51 with a hooked end so as to retain the hook member 41 against the biasing action of the biasing member 47 when the push rod 43 is push along the guide slots 213, 223 to move the hook member 41 of the sliding member 42 toward the second end 24 to engage with said first arm arm 51 of the L-shaped member 50, as best illustrated in FIG. 2. The L-shaped member 50 further has a second arm 54 which is positioned generally perpendicular to the first arm 51 thereof and protrudes from a slot defined by two notches 215, 224 on the periphery of the two halves 21, 22 of the housing so that the first arm 51 can be rotated to either release or retain the hook member 41 of the sliding member 42 by means of externally actuating the second arm 54.

Two steel wires 61, 62 are provided to be linked with a fishline 13 which is passed through the second end 24 of the housing, and the hook member 41 and the second arm 54 of the L-shaped member 50. Each of the wires 61, 62 are respectively bound to the hook member 41 and the second arm 54 of the L-shaped member 50 at one end thereof and connected with each other at the other looped end thereof. One of the looped ends 611, 612 of each of the wires 61, 62 are connected to said fishline 13, as best illlustrated in FIG. 3. Thereby, the hook member 41 and the second arm 54 of the L-shaped member 50 can be pulled toward the second end 24 of the housing at the same time causing the hooked end 53 of the second arm 51 of the L-shaped member 50 to disengage with the hook member 41. At this point the hook member 41 of the sliding member 42 will be automatically moved, in a direction shown by the single arrow in FIG. 4, toward the end 33 of the threaded rod 31, (i.e. the first end 23 of the housing), by the biasing force of the biasing member 47. Therefore, the fishline 13 can be automatically pulled toward the first end 23 of the housing when a baited fishhook connected to one end of the fishline 13 is snapped at by a fish. This action is similar to that of an angler who response to a fish snapping at the baited fishhook by jerking up on the fishline. It is noted that the jerk-back speed of the fishline 15 depends on the strength of the coiled spring 47 which can be adjusted by axially rotating the adjusting member to enable the threaded rod 31 to be moved longitudinally forward or backward with respect to the adjusting member 32.

Referring to FIG. 5, a perspective exploded view of one of the mounting devices 70 is shown. The mounting device 70 includes a tubular hollow member 71 having two pairs of diametrically opposed holes 711, 741 parallelly formed therein, two restraining blocks 73, 75 slidably retained therein, and a coiled spring 77 interposed between the two restraining blocks 73 so as to bias said restraining blocks 73, 75 to move away from each other. Two bores 731, 751 are respectively formed through the restraining blocks 73, 75 which are to be respectively aligned with the holes 72, 74 in the tubular hollow member 71 and define two passages which will individually receive the fishline-holding device 20 and the fishing rod 10 when the two restraining blocks 73, 75 are depressed toward each other.

Figure 6:
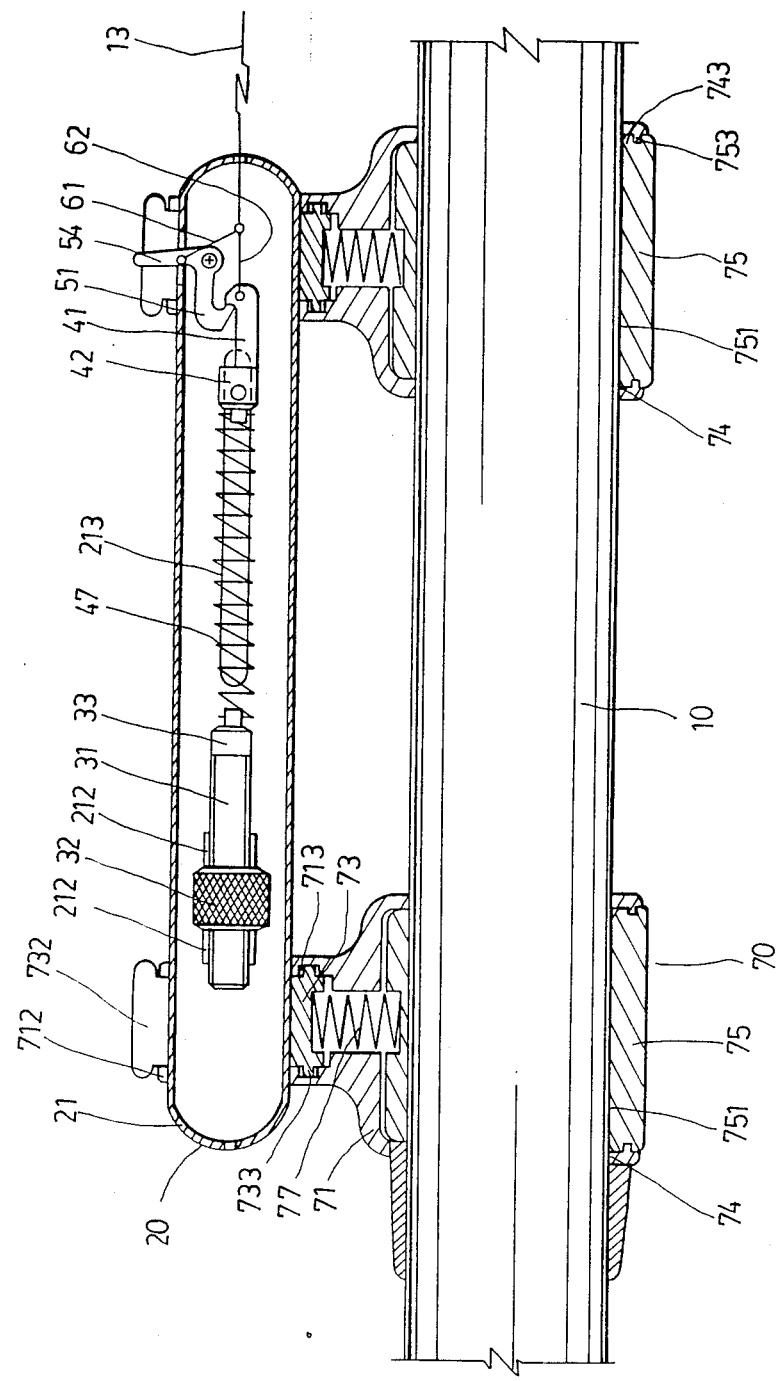
FIG. 6 is a sectional view of the preferred embodiment of the fishing apparatus of this invention.

Referring also to FIG. 6, two diametrically opposed projections 733 are formed at the lower end portion of the restraining block 73 which are slidably received in two opoposed recesses 713 corespondingly formed in the inner face of the middle section of the tubular hollow member 71, so that said restraining block 73 can be slidably retained in the tubular hollow member 71. The other restraining block 75 has two diametrically opposed projections 753 formed at the lower end portion thereof which are received in two recesses 743 formed in the inner face of the lower section thereof. Each of the recesses 743 has a notch 7431 which communicates with one of the holes 74 (see FIG. 5) of the tubular hollow member 71 so that said restraining block 75 can be slidably retained in said tubular hollow member 71.

In assembly, two of said mounting devices 70 are used for mounting the fishline-holding device 20 to the fishing rod 10. The restraining blocks 73, 75 in the tubular members 71 are depressed to provide passages in a manner as described hereinbefore so that the fishline-holding device 20 and the fishing rod 10 can respectively and parallelly pass through the holes 72 in the upper portion of the tubular hollow member 71, the bore 731 of the restraining member 73, the holes 74 in the lower portion of the tubular hollow member 71, and the bore 751 in the restraining block 75. The restraining block 73 has a notch 732 extending from the top thereof to the bore 731 thereof so that the second arm 54 of the L-shaped member 50 can pass through the mounting device 70 during assembly. The two restraining blocks 73, 75 are released and moved away form each other by the coiled spring 77 so as to clamp the fishline-holding device 20 and the fishing rod 10, as best illustrated in FIG. 6.

Referring to FIG. 7, another preferred embodiment of a fishing apparatus includes a fishline-holding device 20' which is connected to a fishing rod 10 by a fishline 14. A segment of fishline 14 connects one end of the fishing rod 10 with the first end 23' of the fishline-holding device 20'. The fishline-holding device 20' of this embodiment is similar to the fishline-holding device 20 of the first embodiment except that the hook member 41' of this embodiment is in the form of a rod having a tapered enlarged end 44'serving as a hooked end, two opposed L-shaped members 50' are provided for retaining said hook member 41', and three steel wires 61, 62, 63 are used for linking the hook member 41', the L-shaped members 50' and another segment of fishline 13.

The two opposed L-shaped members 50' of this embodiment are respectively and pivotally mounted to two mounting plates 214' fixed in the housing 21'. Each of the L-shaped members 50' has a first arm 51' with a hooked end 53' which is to be retained with the hook member 41', a second arm 54' which is generally perpendicular to the first arm, and a return spring 81 provided at the pivot axle thereof for biasing the hooked ends 53' of the first arms 51' to abut with each other, which can be separated by and retained with enlarged end 44' of the hook member 41' against the biasing action of the biasing member 47. Each of the three steel wires 61, 62, 63 has a first looped end and a second end. The first looped ends 611, 621, 631 are connected with one another in series, one first looped end 611 also being connected to the end of the fishline 13, as best illustrated in FIG. 8. The second ends of the steel wires 61, 62, 63 are respectively connected to the second arms 54' of the L-shaped members 50' and the enlarged end 44' of the hook member 41'. The operation of the fishline-holding device of this embodiment is similar to that of the first embodiment and is not described in detail for simplicity's sake.

With this invention thus explained, it is apparent that numerous modifications and vriations can be made without departing from the scope and spirit of this invention. It is therefore intended that this invention be limited only as indicated in the appended claims.

We claim:

1. A fishing apparatus comprising a fishline-holding device which includes:
   an elongated hollow housing having a first and and second end, said housing being formed of two halves which are detachably engaged with each other, said two halves having two opposed guide slots respectively and longitudinally formed therein, and two separate clamp members mounted near said first end of said housing;
   a sliding member having a push rod connected thereto which is slidably mounted in said two guide slots of said housing so that said sliding member can be longitudinally moved along said guide slots, and a hook member extending longitudinally therefrom towards said second end of said housing;
   a threaded rod longitudinally disposed in said housing and clamped by said clamp members of said housing so that said threaded rod can be moved longitudinally and prevented from rotation thereat, said threaded rod having an adjusting member mounted thereon by means of the interconnection of an internal thread provided in said adjusting member and an external thread provided on the threaded rod, said adjusting member being rotatably retained between said clamp members of said housing and having a portion thereof protruding out of an opening formed in said housing, so that said adjusting member can be axially rotated by a user's fingers to enable said threaded rod to move longitudinally;
   a biasing member interconnected between said sliding member and said threaded rod so as to urge said sliding member toward said threaded rod;
   means for retaining said hook member of said sliding member against a biasing action of said biasing member, which is mounted in said housing near said second end thereof; and
   a linking member which links said hook member of said sliding member and said retaining means, being attached to an end of a fishline so that said hook member can be disengaged from said retaining means by the pulling of the said fishline which is triggered by a fish snapping at an baited hook attached to said fishline.

2. A fishing apparatus as claimed in claim 1, wherein said retaining means includes an L-shaped member pivotally mounted to a mounting plate which is provided on said housing, said L-shaped member having a first arm with a hooked end with which said hook member is retained and a second arm which is positioned generally perpendicular to said first arm and which protrudes out from a slot formed in said housing so that said first arm of said L-shaped member can be rotated to retain said hook member of said sliding member by means of externally actuating said second arm of said L-shaped member after said hook member is retained against said biasing action of said biasing member.

3. A fishing apparatus as claimed in claim 2, wherein said linking means includes two steel wires each of which has a first looped end and a second end, said first looped ends of said steel wires being connected with each other, one of said first looped ends also being connected to said first end of said fishline, said second ends of said steel wires being respectively connected to said hook member of said sliding member and said second arm of said L-shaped member so that said L-shaped member can be rotated to disengaged from said hook member by the pulling of the fishline, which is triggered by a fish snapping at the baited hook.

4. A fishing apparatus as claimed in claim 1, wherein said retaining means includes two opposed L-shaped members which are respectively pivotally mounted to two mounting plates fixed in said housing, each of said L-shaped members having a first arm with a hooked end which is to be retained with said hook member of said sliding member, a second arm which is generally perpendicular to said first arm, and a return spring provided thereto for biasing said hooked ends of said first arms to abut with each other, said hooked ends being otherwise separated by and retained with said hook member of said sliding member when said hook member is retained against the biasing action of said biasing member.

5. A fishing apparatus as claimed in claim 4, wherein said linking means includes three steel wires each of which has a first looped end and a second end, said first looped ends of said steel wires being connected with one another in series, one first looped end also being connected to said first end of said fishline, said second ends of said steel wires being respectively connected to said second arms of said L-shaped members and said hook member of said sliding member.

6. A fishing apparatus as claimed in claim 1 further comprising a fishing rod and a pair of mounting devices for mounting said fishline-holding device to said fishing rod, each of said mounting devices including two tubular hollow members each of which has two pairs of diametrically opposed holes parallelly formed therein, two restraining blocks slidably retained therein, and a coiled spring interposed between said restraining blocks so as to bias said restraining blocks to move away from each other, each of said restraining blocks having a bore formed therethrough, said bores aligning with one of said pairs of said holes to form a passage in said tubular hollow member when said restraining blocks are depressed toward each other to a certain position, so that said fishline-holding device and fishing rod can be respectively passed through said passage in said tubular hollow membbers and clamped by said restraining blocks when said restraining blocks are released and biased to move away from each other.

* * * * *